United States Patent
Jeong et al.

(10) Patent No.: US 7,953,594 B2
(45) Date of Patent: May 31, 2011

(54) SPEECH RECOGNITION METHOD AND APPARATUS USING LEXICON GROUP TREE

(75) Inventors: Sang-bae Jeong, Suwon-si (KR); In-jeong Choi, Hwaseong-si (KR); Ick-sang Han, Yonginn-si (KR); Jeong-su Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1305 days.

(21) Appl. No.: 11/342,701

(22) Filed: Jan. 31, 2006

(65) Prior Publication Data

US 2006/0173673 A1   Aug. 3, 2006

(30) Foreign Application Priority Data

Feb. 2, 2005 (KR) .................. 10-2005-0009611

(51) Int. Cl.
*G10L 11/06* (2006.01)
(52) U.S. Cl. .................. 704/10; 704/9; 707/E17.046
(58) Field of Classification Search ............... 704/9–10; 707/E17.046
See application file for complete search history.

(56) References Cited

U.S. PATENT DOCUMENTS

| | | | | | |
|---|---|---|---|---|---|
| 5,008,941 | A | * | 4/1991 | Sejnoha | 704/222 |
| 5,794,178 | A | * | 8/1998 | Caid et al. | 704/9 |
| 5,819,258 | A | * | 10/1998 | Vaithyanathan et al. | 707/2 |
| 5,822,730 | A | * | 10/1998 | Roth et al. | 704/255 |
| 5,828,999 | A | * | 10/1998 | Bellegarda et al. | 704/240 |
| 5,857,169 | A | * | 1/1999 | Seide | 704/256.7 |
| 6,076,053 | A | * | 6/2000 | Juang et al. | 704/236 |
| 6,076,056 | A | * | 6/2000 | Huang et al. | 704/254 |
| 6,092,044 | A | * | 7/2000 | Baker et al. | 704/254 |
| 6,178,401 | B1 | * | 1/2001 | Franz et al. | 704/255 |
| 6,205,428 | B1 | * | 3/2001 | Brown et al. | 704/270 |
| 6,317,707 | B1 | * | 11/2001 | Bangalore et al. | 704/9 |
| 6,415,248 | B1 | * | 7/2002 | Bangalore et al. | 704/1 |
| 6,507,815 | B1 | * | 1/2003 | Yamamoto | 704/231 |
| 6,526,379 | B1 | * | 2/2003 | Rigazio et al. | 704/245 |
| 6,751,584 | B2 | * | 6/2004 | Bangalore et al. | 704/1 |
| 6,782,357 | B1 | * | 8/2004 | Goodman et al. | 704/9 |
| 7,007,069 | B2 | * | 2/2006 | Newman et al. | 709/206 |
| 7,035,802 | B1 | * | 4/2006 | Rigazio et al. | 704/256 |
| 7,197,451 | B1 | * | 3/2007 | Carter et al. | 704/10 |
| 7,627,474 | B2 | * | 12/2009 | Kim et al. | 704/254 |
| 2002/0116196 | A1 | * | 8/2002 | Tran | 704/270 |
| 2003/0061046 | A1 | * | 3/2003 | Zhao et al. | 704/257 |

(Continued)

OTHER PUBLICATIONS

Lin, D. and Pantel, P. 2002. Concept discovery from text. In Proceedings of COLING-02. pp. 577-583. Taipei, Taiwan.*

(Continued)

*Primary Examiner* — Richemond Dorvil
*Assistant Examiner* — Greg Borsetti
(74) *Attorney, Agent, or Firm* — Staas & Halsey LLP

(57) ABSTRACT

A method and an apparatus for selecting a vocabulary closest to an input speech from among lexicons stored in memory, wherein a centroid lexicon representing lexicons belonging to a predetermined lexicon group is generated. Two lexicons, having a longest distance therebetween in the lexicon group, are selected using the centroid lexicon from the lexicon group, and a node indicating the lexicon group branches based on the two selected lexicons. A node having low group similarity is selected from among current terminal nodes, including branch nodes, and the above procedure is repeatedly performed on a lexicon group indicated by the selected node.

16 Claims, 13 Drawing Sheets

U.S. PATENT DOCUMENTS

| | | | | |
|---|---|---|---|---|
| 2003/0212702 | A1* | 11/2003 | Campos et al. | 707/102 |
| 2005/0251390 | A1* | 11/2005 | Catchpole | 704/242 |
| 2006/0053015 | A1* | 3/2006 | Lai et al. | 704/257 |
| 2006/0287848 | A1* | 12/2006 | Li et al. | 704/9 |

OTHER PUBLICATIONS

Patrick Andre Pantel, Dekang Lin, Clustering by committee, University of Alberta, Edmonton, Alta., Canada, 2003.*

Patrick Pantel and Dekang Lin. "Discovering Word Senses from Text" 2002.*

Tan, Steinbach, Kumar. "Data Mining Cluster Analysis: Basic Concepts and Algorithms" 2004.*

Nock et al. "A Comparative Study of Methods for Phonetic Decision—Tree State Clustering" 1997.*

\* cited by examiner

FIG. 2
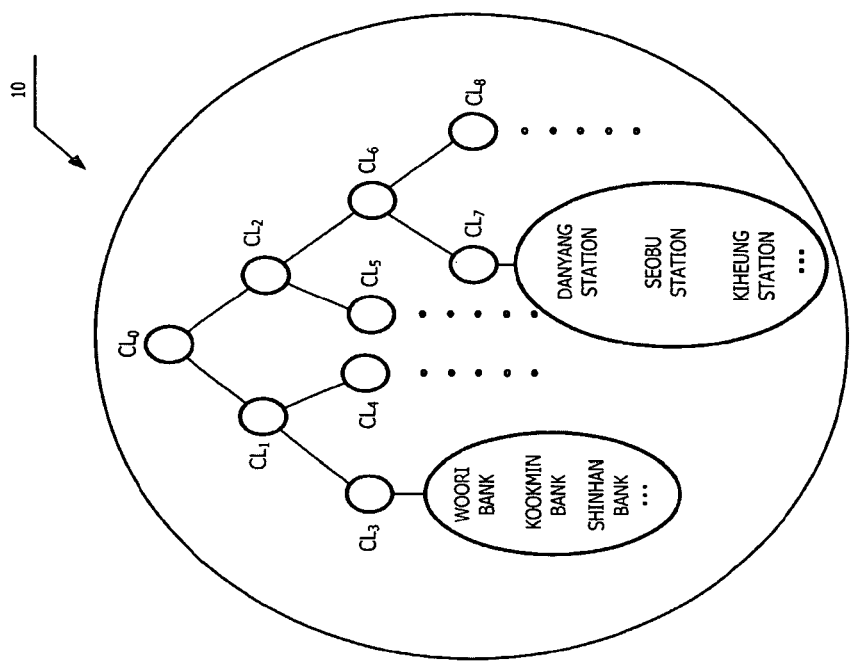
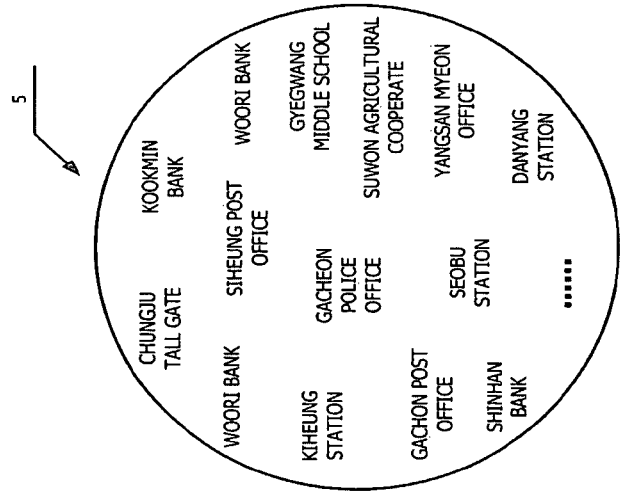

FIG. 20

42th QLEX info

- 31 — NUM_ELEMENTS          69
- 32 — INTRA_DISTANCE        0.528093
- 33 — NUM_WEIGHT_VECTOR     13
- 34 — MAX_DIST_LEX          [CAR MAINA]
- 35 — MIN_STATE_LEX         [DAMO WALL]

36:

```
0.00001 0.00051 0.00238 0.00011 0.00025 0.01046 0.00298 0.00004 0.00023 0.00054 0.00076 0.00066 0.00032 0.01694 ...
0.00085 0.00298 0.00008 0.00225 0.00182 0.00521 0.00906 0.00147 0.01183 0.00008 0.00450 0.00880 0.01835 0.00053 0.01055 0.00001 ...
0.00005 0.00002 0.01632 0.00039 0.00073 0.00076 0.00002 0.00005 0.00280 0.00002 0.00001 0.00062 0.02106 0.00162 0.00012 ...
0.00001 0.00001 0.00214 0.00058 0.00012 0.00004 0.00001 0.01584 0.00003 0.00081 0.00003 0.00002 0.00017 0.00003 0.00001 ...
0.00001 0.00391 0.05581 0.00005 0.00015 0.00003 0.00001 0.00003 0.00001 0.00022 0.00010 0.00005 0.00002 ...
0.00001 0.00006 0.00571 0.00002 0.00061 0.00030 0.00041 0.00029 0.00002 0.00048 0.00008 0.00046 0.00019 0.00053 0.00306 ...
0.00029 0.00020 0.00178 0.00246 0.00394 0.02017 0.00725 0.00011 0.00399 0.00664 0.00420 0.00667 0.00321 0.00163 0.00611 0.01812 ...
...
```

37:
- [GAMGOK STATION]
- [GAMROH CENTER]
- [GANGGYUNG STATION]
- [GANGNAM STATION]
- [GANDDONG STATION]
- [GANGBYUN STATION]
- [GYUNGWON STATION]
- [GOGURYO]
- [GONGNUNG STATION]
- [GWANGGOK STATION]
- ...

SPEECH RECOGNITION METHOD AND APPARATUS USING LEXICON GROUP TREE

CROSS-REFERENCE TO RELATED APPLICATION

Priority is claimed to Korean Patent Application No. 10-2005-0009611 filed on Feb. 2, 2005 in the Korean Intellectual Property Office, the disclosure of which is incorporated herein by reference in its entirety.

BACKGROUND OF THE DISCLOSURE

1. Field of the Disclosure

The present disclosure relates to speech recognition, and more particularly to a method and an apparatus for selecting a vocabulary closest to an input speech from vocabularies stored in memory.

2. Description of the Related Art

Generally, speech recognition can be defined as "a sequence of procedures for extracting phonological or linguistic information from acoustic information contained in voice and enabling a machine to recognize and process the extracted information." Voice conversation is recognized to be the most natural and convenient way of exchanging a large amount of information between human beings and machines. However, there is a limitation in that, in order to use voice conversation in communication between human beings and machines, voice must be translated into a machine-comprehensible code. Such a procedure of translating voice into code is speech recognition.

With respect to devices, having therein speech recognizers using speech recognition technology, for example, a computer, a Personal Digital Assistant (PDA) or an electronic home appliance, commands can be transmitted using a human voice without requiring a separate input device. For example, when desiring to purchase a movie ticket in advance, a user can obtain the desired result of advance purchase by simply speaking a movie title into a microphone, instead of clicking a mouse or pressing keys on a keyboard several times.

However, in order to implement a speech recognizer for recognizing 10,000 or more vocabularies, it is essential to reduce the required memory size and the number of calculations while maintaining a recognition rate. The reason for this is that portable devices are generally limited in memory size and Central Processing Unit (CPU) performance, and even the memory and CPU specifications of a fixed device cannot be increased without eventually increasing the cost of portable devices.

Therefore, in a device having a speech recognizer therein, since hardware, an operating system and other software must be operated in addition to speech recognition, only limited memory is used for speech recognition. Thus, it is difficult to recognize large-scale vocabularies using a conventional scheme in a device having a speech recognizer therein.

The following Table 1 shows required memory according to the number of vocabularies to be recognized in a conventional single pass speech recognition scheme, and Table 2 shows the ratios of portions, occupied by an acoustic model, a search network, a token, etc., to the entire required memory. Here, each value shown in Table 1 is in a unit of megabytes (Mbytes), and each value shown in Table 2 is represented in percentage (%).

TABLE 1

|  | Acoustic model | Search network | Token | Others | Total |
|---|---|---|---|---|---|
| 200 word class | 2.16 | 0.10 | 0.10 | 0.32 | 2.68 |
| 10,000 word class | 2.16 | 2.98 | 3.45 | 0.52 | 9.11 |
| 200,000 word class | 2.16 | 30.00 | 27.00 | 2.00 | 61.16 |

TABLE 2

|  | Acoustic model | Search network | Token | Others | Total |
|---|---|---|---|---|---|
| 200 word class | 80.6 | 3.7 | 3.7 | 11.9 | 100.0 |
| 10,000 word class | 23.7 | 32.7 | 37.8 | 5.7 | 100.0 |
| 200,000 word class | 3.5 | 49.1 | 44.1 | 3.3 | 100.0 |

Referring to Table 1, it can be seen that, as the number of vocabularies to be recognized increases, required memory size rapidly increases from 2.68 Mbytes to 61.16 Mbytes. Further, referring to Table 2, it can be seen that, as the number of vocabularies to be recognized increases, the percentage of the portion occupied by a search network and a token, compared to an acoustic model, rapidly increases.

The above results in the conventional speech recognition scheme indicate that the conventional scheme loads all networks required for searches of memory. Accordingly, as the number of vocabularies to be recognized increases, the size of memory and the number of calculations rapidly increase. Therefore, it is difficult to recognize large vocabularies in a device having insufficient hardware support through the search method used in the conventional speech recognition scheme.

FIG. 1 is a diagram showing detailed fields of a related speech recognition technology. Technologies for reducing the hardware resources of a speech recognizer are classified into search area optimization technology and acoustic model optimiztion technology. Further, search area optimization technology is divided into an individual access scheme and a group access scheme.

The individual access scheme uses a model topology technique as disclosed in U.S. Pat. No. 6,178,401 (hereinafter referred to as '401 patent). Further, the group access scheme can be divided into a scheme using a representative lexicon group, and a lattice construction scheme using a small number of representative acoustic models.

The '401 patent "Method for reducing search complexity in a speech recognition system," issued to IBM corporation, is described in brief below.

The technology discloses the steps of storing only the score of a state having the highest score and not the scores of the model-based node of a search network with respect to all states, selecting N candidates based on a terminal score, and performing detailed search on the N candidates.

As a result, the number of scores to be stored in a required token at the time of searching a network decreases, and distinctiveness of scores after a first search does not increase. Thus, there is an advantage in that the rate of errors caused by node-pruning is low. However, there still is a prevalent problem of increased memory requirement caused by search networks when recognizing large vocabularies, which remains to be overcome.

SUMMARY OF THE DISCLOSURE

Accordingly, the present disclosure has been made in view of the foregoing problems in the prior art, and an object of the present disclosure is to provide a speech recognition method and apparatus using a lexicon group tree, which reduce the utilization of system resources of a speech recognizer.

Another object of the present disclosure is to provide a speech recognition method and apparatus using a lexicon group tree, which improve the recognition speed of a speech recognizer.

In accordance with one aspect of the present disclosure to accomplish the above objects, there is provided a method of generating a lexicon group tree, comprising the steps of (a) generating a centroid lexicon representing lexicons belonging to a predetermined lexicon group; (b) selecting two lexicons, having a longest distance therebetween in the lexicon group, using the centroid lexicon from the lexicon group, and branching a node indicating the lexicon group, based on the two selected lexicons; and (c) selecting a node having low group similarity from among current terminal nodes, including branch nodes, and repeatedly performing steps (a) and (b) on a lexicon group indicated by the selected node.

In accordance with another aspect of the present disclosure to accomplish the above objects, there is provided a method of recognizing vocabularies, comprising the steps of (a) segmenting an input acoustic signal into frames; (b) performing a feature transform on the segmented acoustic signal; (c) determining similarities between centroid lexicons, representing two branch nodes, and the feature-transformed acoustic signal, and selecting a node having higher similarity; (d) repeatedly performing step (c) until the selected node is a terminal node; and (e) loading a lexicon group of the terminal node if the selected node is the terminal node, and selecting a lexicon having higher similarity between the lexicon and the feature-transformed acoustic signal from the loaded lexicon group.

In accordance with a further aspect of the present disclosure to accomplish the above objects, there is provided a device for generating a lexicon group tree, comprising a centroid lexicon generation unit for generating a centroid lexicon representing lexicons belonging to a predetermined lexicon group; a node branching determination unit for selecting a node having low group similarity from among current terminal nodes; and a node branching unit for selecting two lexicons, having a longest distance therebetween in the lexicon group, using the centroid lexicon from the lexicon group, and branching a node indicating the lexicon group, based on the two selected lexicons.

In accordance with yet another aspect of the present disclosure to accomplish the above objects, there is provided a device for recognizing vocabularies, comprising a frame segmentation unit for segmenting an input acoustic signal into frames; a feature transform unit for performing a feature transform on the segmented acoustic signal; a node branching determination unit for repeatedly performing a procedure of determining similarities between centroid lexicons, representing two branch nodes, and the feature-transformed acoustic signal and selecting a node having higher similarity until the selected node is a terminal node; and a lexicon selection unit for loading a lexicon group of the terminal node if the selected node is the terminal node, and selecting a lexicon having higher similarity between the lexicon and the feature-transformed acoustic signal from the loaded lexicon group.

BRIEF DESCRIPTION OF THE DRAWINGS

FIG. 2 is a diagram showing a process of generating a lexicon group tree from recognition target lexicons using a lexicon group tree generation device according to an embodiment of the present invention;

FIG. 20 is a diagram showing values output as the result of experiments according to an embodiment of the present invention.

DESCRIPTION OF EXEMPLARY EMBODIMENTS

Figure 1:
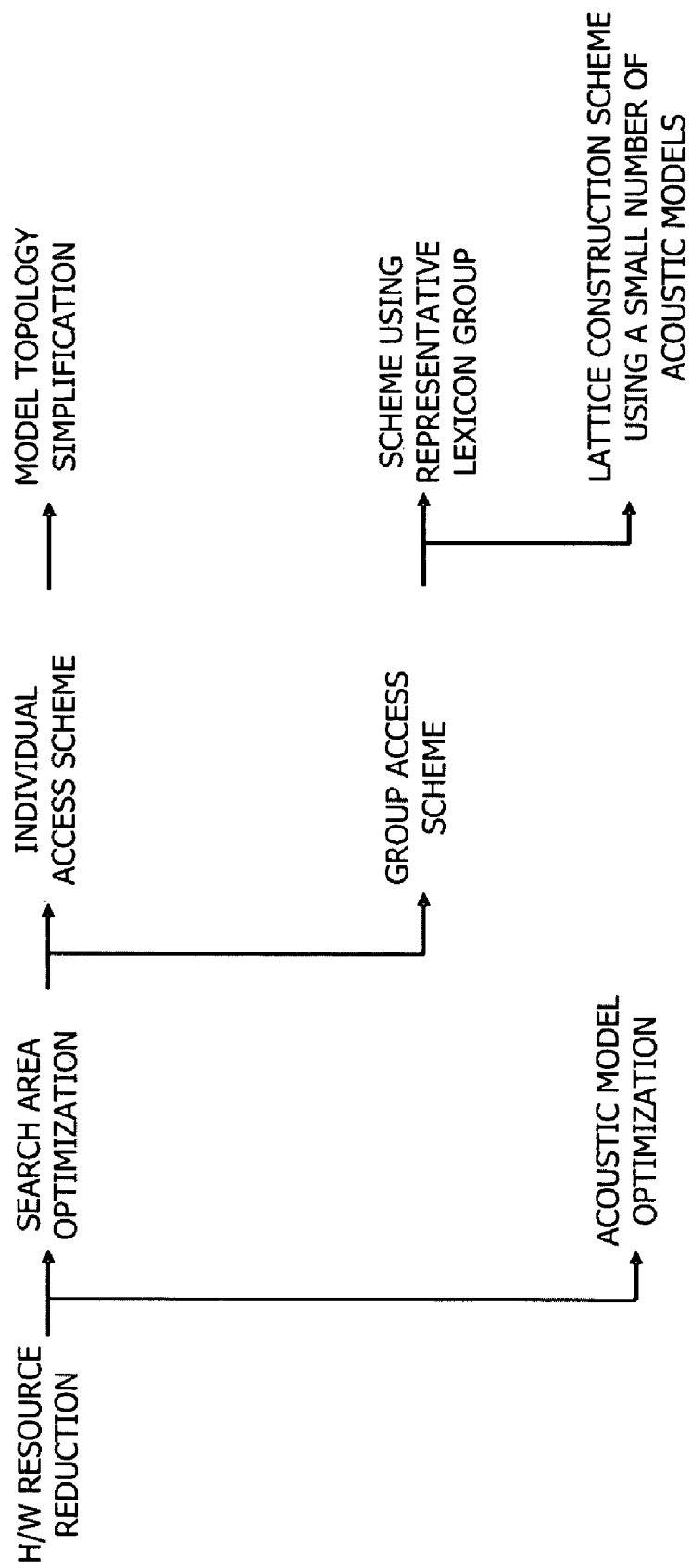
FIG. 1 is a diagram showing the detailed fields of speech recognition technology related to the present disclosure.

Hereinafter, exemplary embodiments of the present invention will be described in detail with reference to the attached drawings. The features and advantages of the present invention will be more clearly understood from the embodiments, which will be described in detail in conjunction with the accompanying drawings. However, the present invention is not limited to the embodiments disclosed herein, but can be implemented in various forms with different advantages and features. The embodiments are provided to complete the disclosure of the present invention and sufficiently notify those skilled in the art of the scope of the present invention. The present invention should be defined by the attached claims. The same reference numerals are used throughout the different drawings to designate the same or similar components.

A fundamental aspect of the present disclosure is to group lexicons having similar pronunciation in the form of a tree structure (hereinafter referred to as a "lexicon group tree"), and to generate virtual lexicons capable of representing respective groups. As examples of similar lexicons, "Arlington middle school, Sequoia middle school, New York high school, etc.," in the English language can be taken.

In this case, the present disclosure can perform speech recognition over multiple stages. The present disclosure can employ various classification methods, such as large-scale classification, middle-scale classification and small-scale classification, based on the scope of classification of terminal nodes. The terminal node has a unique lexicon group.

A speech recognition system according to the present disclosure is divided into a lexicon group tree generation device 100 and a speech recognition device 200. The lexicon group tree generation device 100 generates a lexicon group tree from target vocabularies (the number of which may be 200, 10000 or 200000). Further, the speech recognition device 200 searches for a vocabulary matched with a currently input speech signal using the generated lexicon group tree.

FIG. 2 is a diagram showing a process of generating a lexicon group tree 10 from corresponding lexicons of target vocabularies 5 using the lexicon group tree generation device 100. The vocabularies to be recognized 5 generally include a plurality of lexicons having a different number of phonemes and states. A single node $CL_n$ denotes a single lexicon group.

A root node $CL_0$, denoting a group of the lexicons 5, branches into two nodes $CL_1$ and $CL_2$ based on predetermined criteria, and each branch node branches again into nodes based on the criteria. If the above procedure is repeatedly performed, a fractionized lexicon group composed of similar lexicons can be found.

Figure 3:
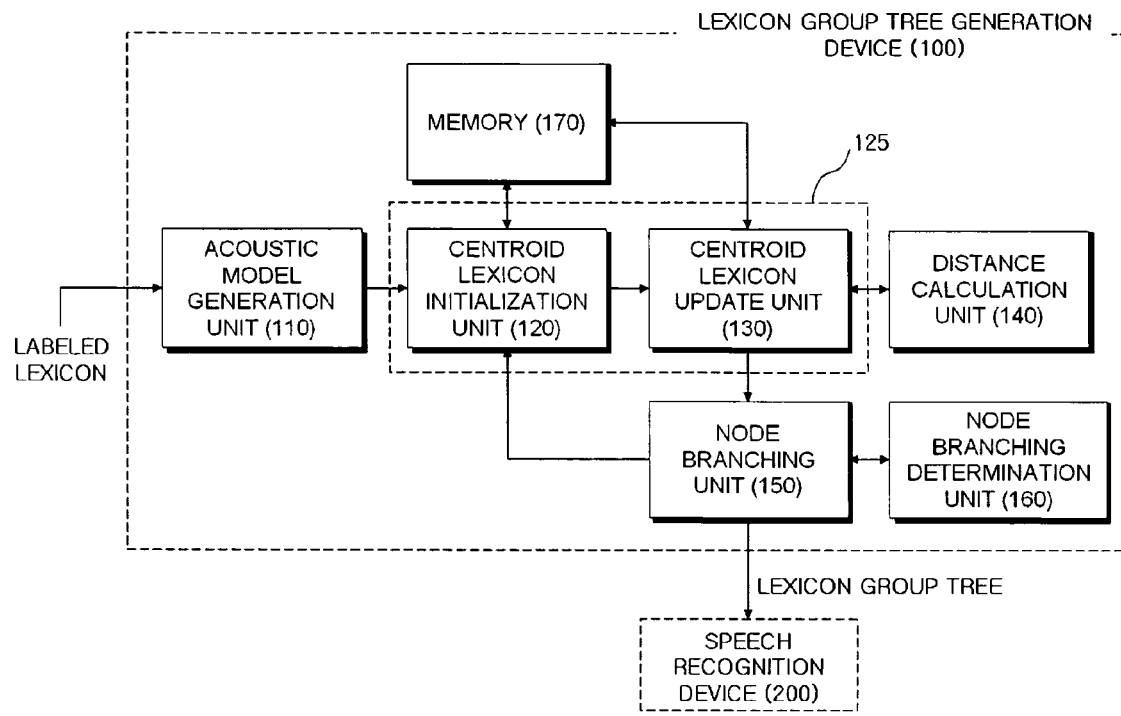
FIG. 3 is a block diagram showing the construction of a lexicon group tree creation device according to an embodiment of the present invention.

FIG. 3 is a block diagram showing the construction of the lexicon group tree generation device 100 according to an embodiment of the present disclosure.

An acoustic model generation unit 110 generates an acoustic model for each state of a phoneme using lexicons, to which predetermined labels stored in a training database (not shown) are attached (hereinafter referred to as "labeled lexicons"). The term "labeled lexicons" means acoustic signals pronounced by a number of people for a specific word or specific phoneme. Generally, even for a phoneme ideally recognized to be unique, recognition and pronunciation results by individual persons differ from each other. Accordingly, labeled lexicons or actual acoustic samples are required.

Further, the reason for generating an acoustic model in states lower than phonemes, not in phonemes, is that, even for a single phoneme, the amount of information required to actually express the features of the phoneme differs. Therefore, each phoneme may be composed of one to three states. The number of states required to constitute a single phoneme can be determined by trial and error in consideration of the length of the phoneme, the features of the phoneme, etc. As a result, the number of suitable states for each phoneme can be determined.

Figure 4:
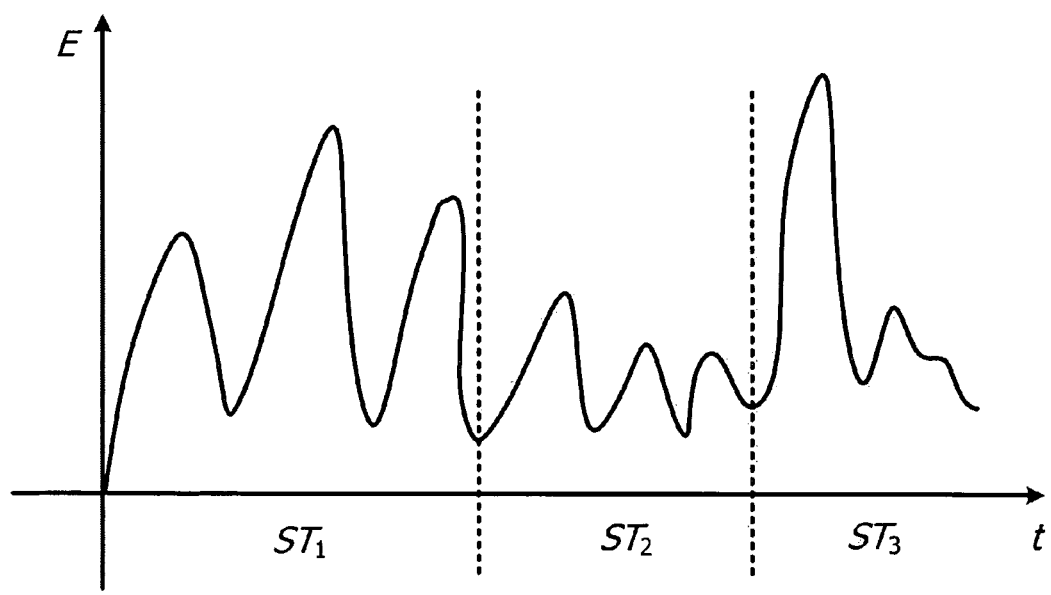
FIG. 4 is a graph showing the acoustic signal of a phoneme having three states.
Figure 5:
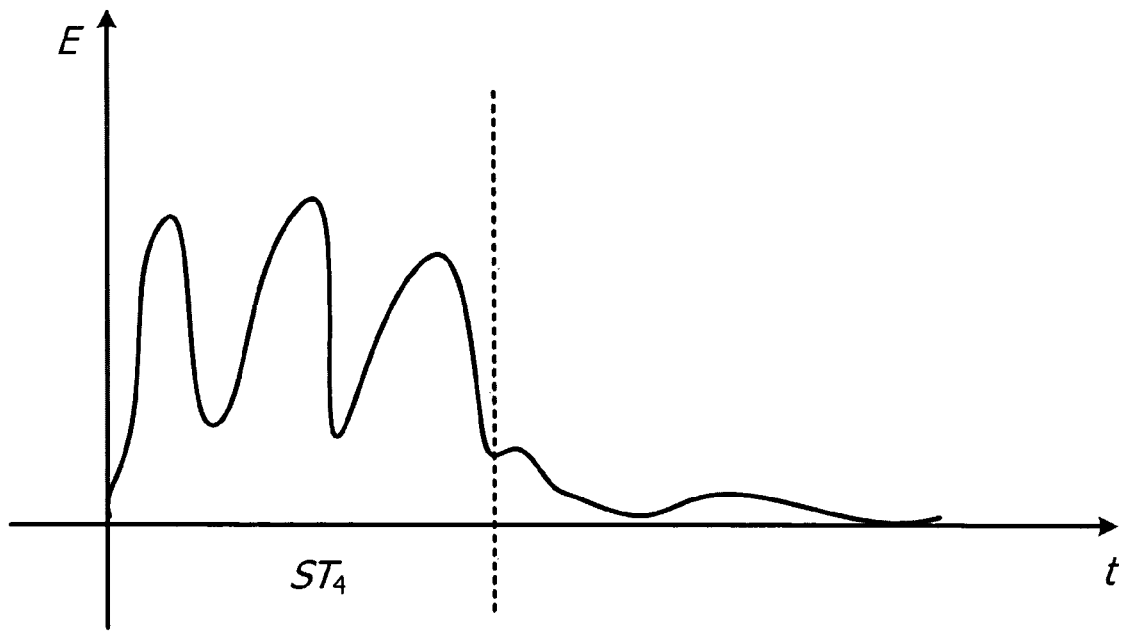
FIG. 5 is a graph showing the acoustic signal of a phoneme having a single state.

For example, it is assumed that there is a first phoneme in which variation in acoustic energy versus time is shown in FIG. 4 and a second phoneme in which variation in acoustic energy versus time is shown in FIG. 5. It can be seen that the first phoneme is long and exhibits somewhat complex features, while the second phoneme is short and exhibits relatively simple features. Accordingly, the first phoneme may be composed of three states $ST_1$, $ST_2$ and $ST_3$, and the second phoneme may be composed of a single state $ST_4$. Generally, there is a tendency for a vowel to have more states than a consonant.

Figure 6:
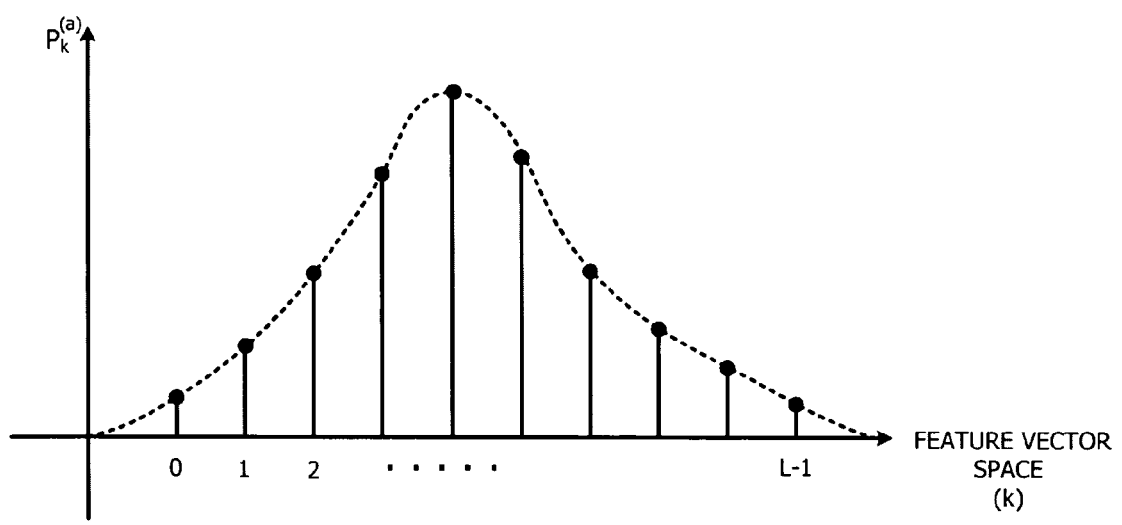
FIG. 6 is a graph showing an example in which a state (a) of a certain phoneme is modeled in a feature vector space.

An acoustic sample for each phoneme is feature-transformed with respect to each determined state, and is expressed by a value in a feature vector space. If this procedure is performed on respective acoustic samples obtained from a number of people, and the results thereof are averaged, an acoustic model in the feature vector space of FIG. 6 can be determined. In FIG. 6, the magnitude of a feature vector or the size of a feature vector space is L, and k is an index indicating each value of a feature vector and has a value ranging from 0 to L−1. The vertical axis of FIG. 6 denotes the probability that a signal corresponding to each index k will be found. Since the acoustic model of FIG. 6 exhibits discrete probability distribution, 1 is obtained if the heights (probabilities) of respective signals are added to each other.

A feature transform will be described in detail later with reference to the description of a feature transform unit 230 of the speech recognition device 200.

The acoustic model for each state generated by the acoustic model generation unit 110 (for example, a second state of a phoneme "a" is stored in memory 170.

A centroid lexicon generation unit 125 performs the function of generating a centroid lexicon, representing lexicons belonging to a corresponding lexicon group, and may include a centroid lexicon initialization unit 120 and a centroid lexicon update unit 130.

The centroid lexicon initialization unit 120 initializes a virtual centroid lexicon of a corresponding lexicon group. The corresponding lexicon group means all recognition target lexicons at an initial stage, and means respective lexicon groups obtained through node branching after node branching has been performed.

The initialization procedure includes step S1 of multiplying the average number of states of a corresponding lexicon group by $\alpha$ ($\leq 1$) and determining the initial number of states represented by a predetermined integer, step S2 of uniformly segmenting each lexicon existing in the corresponding lexicon group into states, based on the determined initial number of states, step S3 of allocating the uniformly segmented states to the states of a corresponding centroid lexicon, and step S4 of obtaining virtual average models for respective states of the centroid lexicon.

For example, if the average number of states of a corresponding lexicon group is 6.3, the initial number of states may be set to an integer that does not exceed 6.3, such as 6 or 5. If the initial number of states of the centroid lexicon is set to 6, $M_1+2/6*M_2$ is allocated to a first state of the centroid lexicon when the first lexicon having 8 states is uniformly segmented. In this case, $M_n$ is an acoustic model of an n-th state of the first lexicon. Similar to this, $4/6*M_2+4/6*M_2$ is allocated to a second state of the centroid lexicon. Subsequent states are also uniformly segmented and allocated.

If a second lexicon having four states is uniformly segmented, $4/6*M_1$ is allocated to a first state of a centroid lexicon. Further, $2/6*M_1+2/6*M_2$ is allocated to a second state of the centroid lexicon. Subsequent states are also uniformly segmented and allocated.

The models allocated to respective states of the centroid lexicon are averaged to obtain an average vector, thus the procedure of initializing the centroid lexicon is completed.

The centroid lexicon update unit 130 performs distance matching with respective lexicons in a corresponding lexicon group, based on the initialized centroid lexicon, and allocates matched states to respective states of the centroid lexicon. Such a matching procedure is repeatedly performed until the procedure has been performed on all lexicons in the corresponding lexicon group. Further, the centroid lexicon update unit 130 obtains an average vector by averaging models allocated to respective states of the centroid lexicon, thus completing the procedure of updating the centroid lexicon.

Such distance matching or the calculation of the distance between lexicons is performed by a distance calculation unit 140. Generally, in conventional speech recognition devices, respective states are distributed by a linear sum of a continuous normal distribution function, but, in the present disclosure, respective states are modeled to have a discrete probability distribution so as to facilitate calculation and algorithm implementation at the time of generating a lexicon group tree. Thereafter, at a detailed lexicon search step, an acoustic model, in which respective states are implemented with a linear sum of a continuous normal distribution, is used.

In order to perform distance matching, the distance (indicated by IL) between state (a) and state (b), defined in the following Equation [1], must be obtained, $$IL = 2ENT_{mean} - (ENT_a + ENT_b) \quad [1]$$

where $ENT_a =$ $-\sum_{k=0}^{L-1} P_k^{(a)} \log_2 P_k^{(a)}$ and $ENT_b = -\sum_{k=0}^{L-1} P_k^{(b)} \log_2 P_k^{(b)}$ are satisfied, and $ENT_{mean} = -\sum_{k=0}^{L-1} P_k^{(mean)} \log_2 P_k^{(mean)}$ and $P_k^{(mean)} =$ $\dfrac{P_k^{(a)} + P_k^{(b)}}{2}$ are satisfied.

Figure 7:
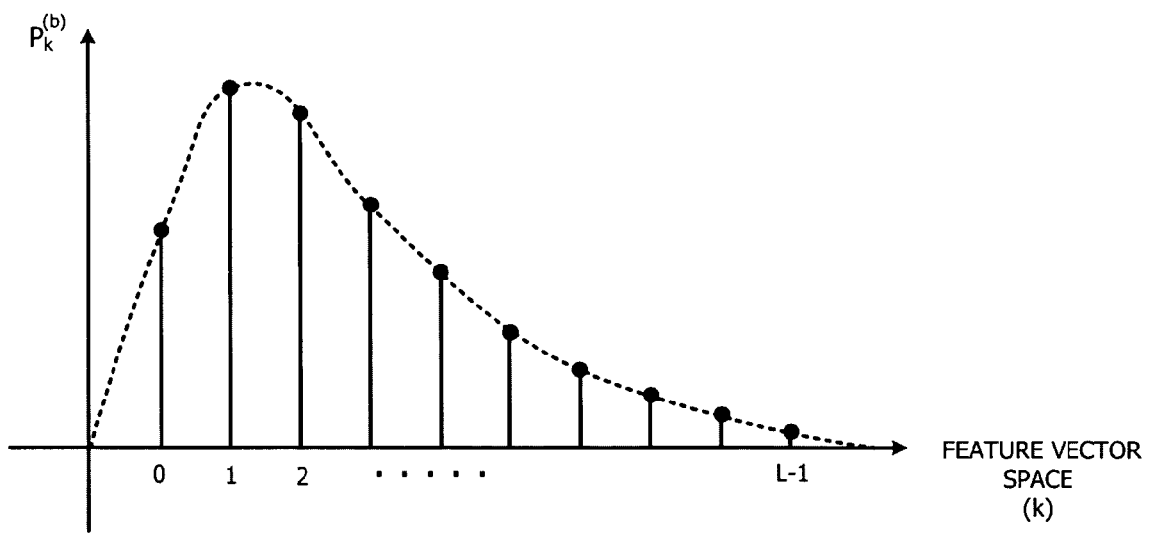
FIG. 7 is a graph showing an example in which a state (b) of another phoneme is modeled in a feature vector space.
Figure 8:
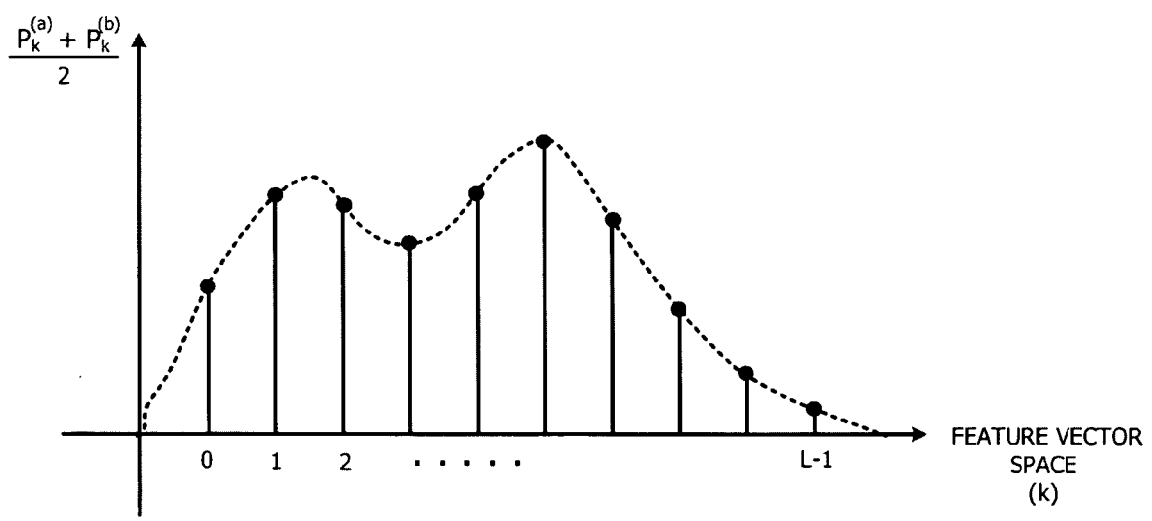
FIG. 8 is a graph showing an average model of the models of FIGS. 6 and 7.

$P_k^{(a)}$ means a component in a distribution in the feature space of a certain state (a) of a certain lexicon, that is, in the acoustic model of the lexicon, as illustrated in FIG. 6. Similar to this, $P_k^{(b)}$ means a component in the acoustic model of a certain state (b) of another lexicon (illustrated in FIG. 7). Therefore, $P_k^{(mean)}$ means a component in the acoustic model of FIG. 8, obtained by averaging the acoustic model of state (a) and the acoustic model of state(b). L is the number of representative vectors extracted from a feature space, and the representative feature vectors are selected from a training database.

The value ENT means an entropy value of the acoustic model of each state, as defined above, so IL is an index indicating the difference between both acoustic models. That is, as the acoustic models become similar to each other, IL approaches "0", while, as they become different from each other, IL increases.

Figure 9:
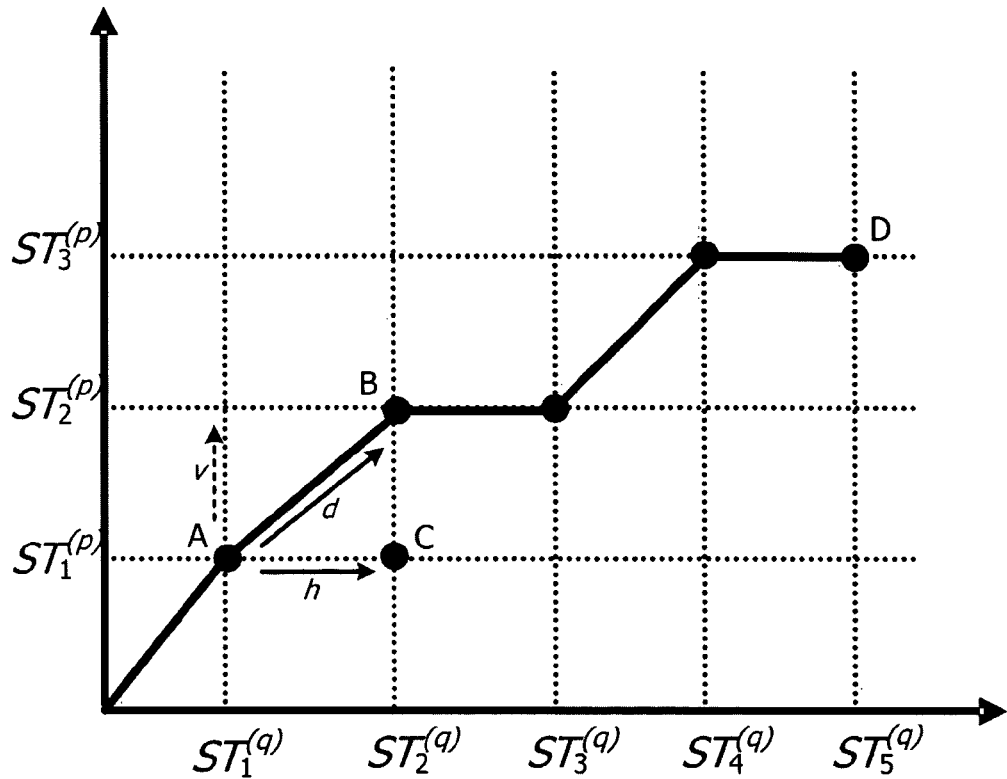
FIG. 9 is a graph showing an example of the result of the distance matching between one lexicon (p) and another lexicon (q)

If the distance between states can be obtained, distance matching can be performed between one lexicon and another lexicon using the obtained distance. FIG. 9 is a graph showing an example of the result of the distance matching between one lexicon (p) and another lexicon (q). In the example of FIG. 9, the reference lexicon (p) is composed of three states, that is, $ST_1^{(p)}$, $ST_2^{(p)}$ and $ST_3^{(p)}$, and the lexicon (q) compared thereto is composed of five states, that is, $ST_1^{(q)}$, $ST_2^{(q)}$, $ST_3^{(q)}$, $ST_4^{(q)}$ and $ST_5^{(q)}$. In this case, if the number of states of the compared lexicon is smaller than that of the reference lexicon, the axes of the states are replaced with each other.

Actual matching between states proceeds in a direction, having a minimum distance, among a right horizontal direction h and an upper-right diagonal direction d, and does not proceed in an upward vertical direction v. For example, there are locations B and C as locations to which matching can proceed from location A. The subsequent coordinate point B or C to which matching will proceed from the current coordinate point A is determined by cumulative distances of the subsequent coordinate points B and C.

Such a cumulative distance for each coordinate point can be defined by the following Equation [2], $$ACC\_Dist(x, y) = Dist(x, y) + \min\begin{cases} ACC\_Dist(x-1, y-1) \\ ACC\_Dist(x-1, y) \end{cases} \quad [2]$$

where x and y mean an x-coordinate value and a y-coordinate value at a certain coordinate point, and Dist(x,y) means the distance (IL in Equation [1]) between a state corresponding to x and a state corresponding to y at the corresponding coordinate point. Further, ACC_Dist(x,y) means a cumulative distance at a current coordinate point, and ACC_Dist(x-1,y) means a cumulative distance at the coordinate point to the left of a current coordinate point, and ACC_Dist(x-1,y-1) means a cumulative distance at the coordinate point to the lower left of a current coordinate point.

If Equation [2] is used in this way, the cumulative distance can be obtained at each of a total of 15 coordinate points. An example of the cumulative distance can be displayed in FIG. 10. Through this matching procedure, it can be consequently seen that $ST_1^{(q)}$ corresponds to $ST_1^{(p)}$, $ST_2^{(q)}$ and $ST_3^{(q)}$ correspond to $ST_2^{(p)}$, and $ST_4^{(q)}$ and $ST_5^{(q)}$ correspond to $ST_3^{(p)}$. Further, a final cumulative distance (4.4 in FIG. 10) may be an index indicating the distance between the lexicon (p) and the lexicon (q). Such a distance between lexicons is a value obtained by accumulating the distances between respective states. If two lexicons are given, the distance between the lexicons can be obtained using the distances between states regardless of the number of states of the lexicons.

Figure 10:
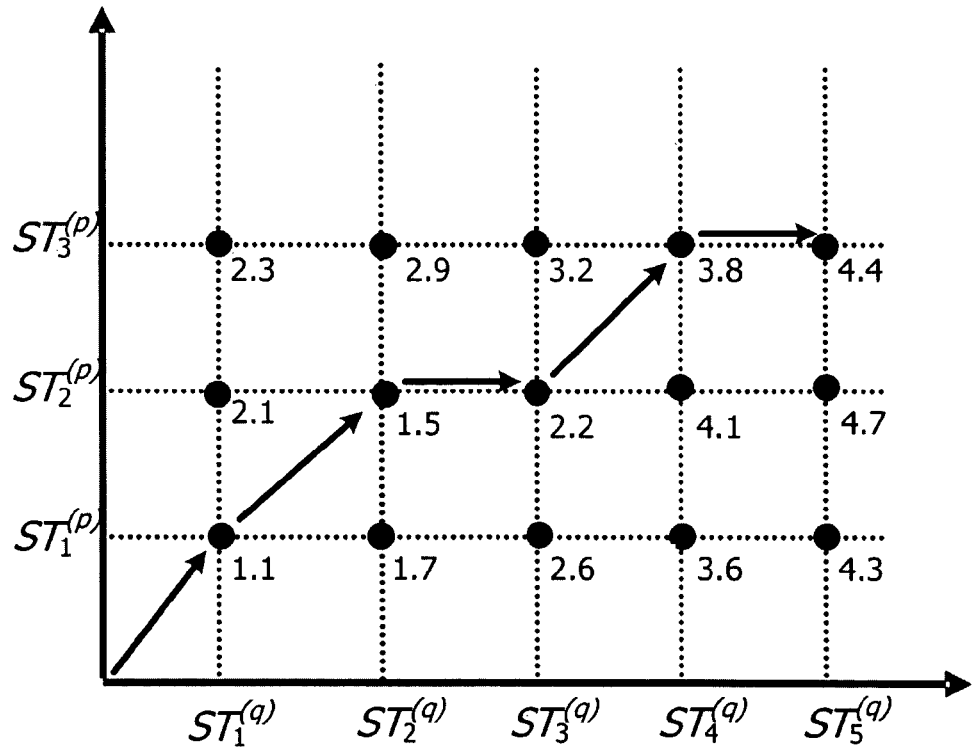
FIG. 10 is a graph showing an example of cumulative distances indicated at respective coordinate points of FIG. 9.
Figure 11:
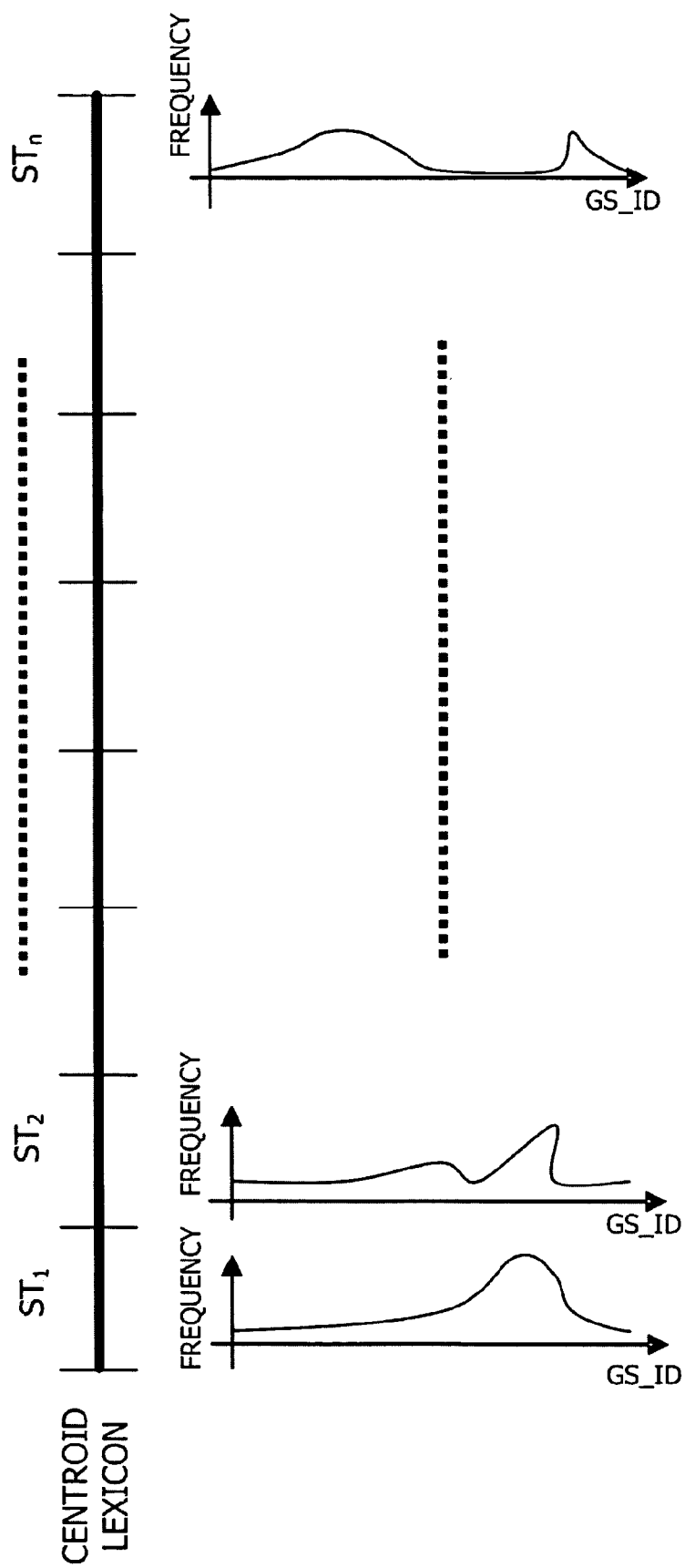
FIG. 11 is a graph showing the frequency of a global state to each state of a centroid lexicon.

Referring to FIG. 3 again, the centroid lexicon update unit 130 performs distance matching between the centroid lexicon, initialized by the centroid lexicon initialization unit 120, and each lexicon in a corresponding lexicon group, as shown in FIG. 10, and allocates matched states, obtained as the result of distance matching, to respective states of the centroid lexicon. As a result, as shown in FIG. 11, the frequencies of global states matched with respective states ($ST_1$ to $ST_n$) of the centroid lexicon are obtained, and are stored in memory 170. In this case, global states mean all states constituting phonemes of corresponding language, which are defined for speech recognition.

For example, if three states are allocated to each phoneme in Korean speech recognition implemented by the definition of 43 basic phonemes, a total of 129 global states exists. Therefore, an arbitrary state of an arbitrary phoneme is allocated a global state ID (GS_ID) in a range of 0 to 128.

Figure 12:
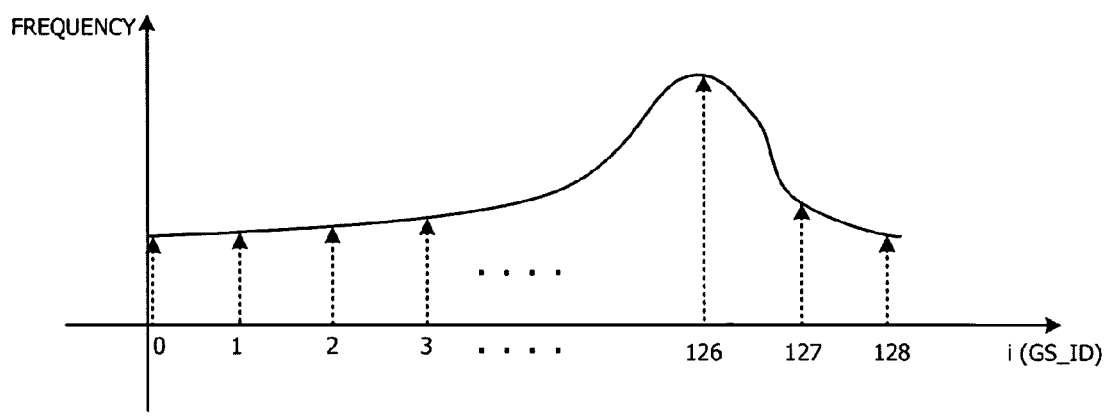
FIG. 12 is a graph showing an example of the distribution of the frequency of a global state matched with a certain state of a centroid lexicon.

FIG. 12 is a graph showing the frequency distribution of global states matched with certain states of a centroid lexicon. In this case, the number of global states may be 129 as described above. The number of matching times, that is, a frequency, can be obtained depending on each global state indicated by GS_ID. As described above with reference to FIG. 6, since each state has an acoustic model in a feature vector space, each state of the centroid lexicon can have a virtual acoustic model, to which a weighting value is applied according to a frequency.

As described above, the centroid lexicon update unit 130 allocates global states to respective states of the centroid lexicon through distance matching, and then generates virtual acoustic models for the states of the centroid lexicon, using a weighted average of the global states as shown in the following Equation [3]. In this case, M means a virtual acoustic model for a certain state, and $M_i$ means a model of global states matched with the state (i is GS_ID). Further, $f_i$ means the frequency at which each global state is matched.

$$M = \frac{f_i}{\sum_i f_i} \times M_i \quad [3]$$

As described above, after the centroid lexicon of a certain lexicon group is updated by the centroid lexicon update unit 130, whether to branch a node is determined based on the updated centroid lexicon.

Referring to FIG. 3 again, a node branching determination unit 160 selects a node to branch among currently existing terminal nodes, based on predetermined criteria. The node branching unit 150 allows the node, determined to branch, to branch into two or more nodes. Such a node branching process includes two procedures, that is, a procedure of determining whether to branch a node, and a procedure of actually branching the corresponding node. First the procedure of determining a node to branch will be described.

The selection of a node by the node branching determination unit 160 is first performed based on the degree to which lexicons in each lexicon group indicated by current terminal nodes are similar, that is, group similarity. If a great number of dissimilar lexicons are included in a lexicon group, it means that the lexicon group must be further subdivided. Group similarity can be indicated by several indices, but the present disclosure uses a variance or standard deviation of lexicons belonging to a lexicon group as an example of an index indicating group similarity. Here, as the variance or standard deviation increases, the group similarity decreases.

Figure 13:
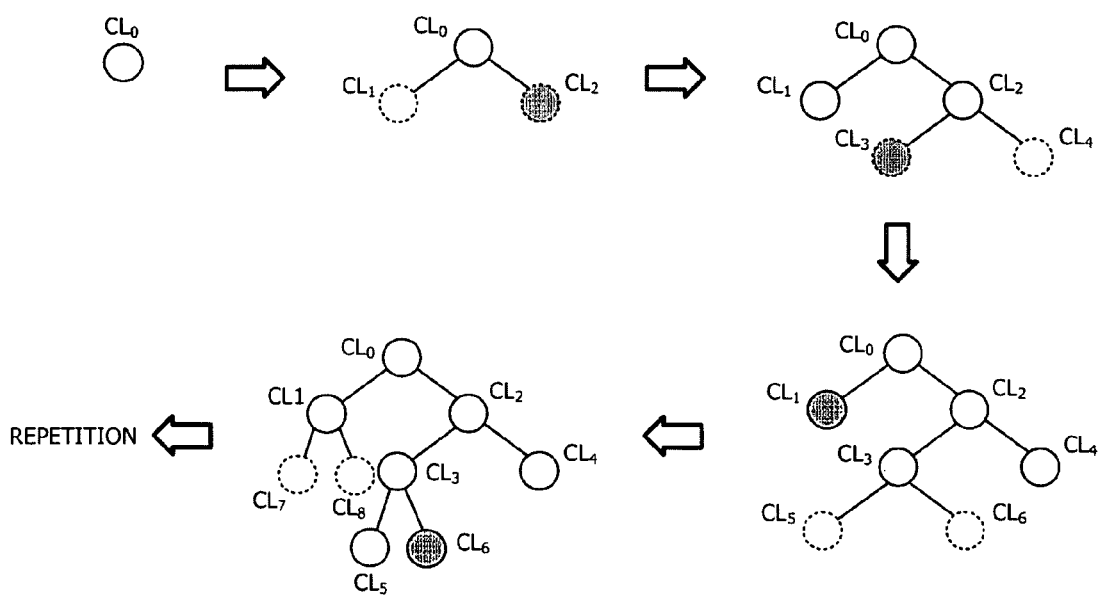
FIG. 13 is a diagram showing an example of a node branching procedure performed by a node branching unit.

The procedure of branching a node by the node branching determination unit 160 is described with reference to FIG. 13. In FIG. 13, nodes indicated by dotted lines denote current branch nodes, and shaded nodes denote nodes to branch at a subsequent stage.

First, a root node $CL_0$, indicating all recognition target lexicons, branches into two nodes $CL_1$ and $CL_2$. Current terminal nodes are $CL_1$ and $CL_2$, and $CL_2$ may be a node to branch later if the group similarity of $CL_2$ is determined to be lower than that of $CL_1$ by the node branching determination unit 160. Next, $CL_2$ branches into $CL_3$ and $CL_4$, and current terminal nodes at this time are $CL_1$, $CL_3$ and $CL_4$, so that $CL_3$ having the lowest group similarity among the nodes may be a node to branch later.

The node $CL_3$ branches into $CL_5$ and $CL_6$, and current terminal nodes are $CL_1$, $CL_4$, $CL_5$ and $CL_6$. In this case, $CL_1$ having the lowest group similarity among the nodes branches into $CL_7$ and $CL_8$. Such a procedure is repeatedly performed to generate a lexicon group tree. In FIG. 13, an example in which a single node branches into two nodes has been described, but the present disclosure is not limited to the example, and a single node can branch into three or more nodes. That is, when one of the current terminal nodes branches out, all nodes that have group similarity lower than a predetermined threshold value (or have the variance or standard deviation of lexicons higher than a threshold value) may be extended.

Meanwhile, termination criteria by which such a procedure is to be repeatedly performed may be considered. In the present disclosure, as an example of the termination criteria, a criterion by which a variance or standard deviation, indicating group similarity, becomes lower than a predetermined threshold value may be used. However, the present disclosure is not limited to this example, but can adopt a method of using a criterion by which the number of lexicons belonging to a corresponding node decreases to a certain number or less.

Figure 14:
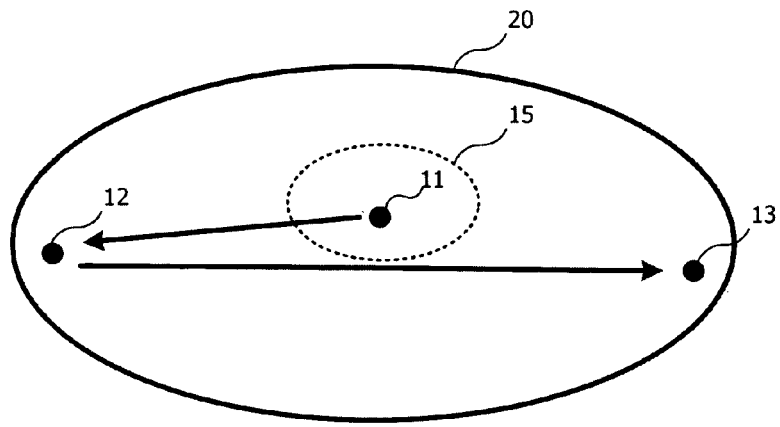
FIG. 14 is a diagram showing a method of branching a node.

A process of actually branching a node by the node branching unit 150 using the above-described node branching criteria is described in detail with reference to FIG. 14.

In order to divide a certain lexicon group 20, an initialization procedure performed by the centroid lexicon initialization unit 120 and an update procedure performed by the centroid lexicon update unit 130 using an initialized centroid lexicon are first executed. If an updated centroid lexicon 11 for a certain lexicon group (this is a virtual lexicon, not an actual lexicon) is determined, a first lexicon 12 having the longest distance to the centroid lexicon 11 is selected from the corresponding lexicon group 20. Such a distance between lexicons can be determined by the cumulative distance calculated by the distance calculation unit 140. Next, a second lexicon 13 having the longest distance to the first lexicon 12 is selected from the lexicon group 20. As a result, two lexicons 12 and 13 having the longest distance therebetween within the corresponding lexicon group 20 are selected from the lexicon group 20.

The remaining lexicons belonging to the lexicon group are bisected based on the two lexicons 12 and 13 (actual lexicons) selected in this way. The bisecting procedure is performed by allocating each of the remaining lexicons to the closer one of the two lexicons. In this way, if all lexicons within the corresponding lexicon group are bisected, the node branching procedure is completed.

However, as another embodiment of the present disclosure, a lexicon, having a distance to the centroid lexicon that is within a predetermined threshold value, can be included in both of two nodes on which the two lexicons are based, without the lexicons being simply bisected. In FIG. 14, it may be undesirable that a certain lexicon, included in an area 15 in which the distance between the certain lexicon and the centroid lexicon is shorter than a certain threshold value, be allocated to the first lexicon 12 or second lexicon 13. In this case, lexicons existing in the area 15 are allocated to both of the lexicons 12 and 13, thus reducing error in the recognition of speech.

As described above, if a lexicon group tree is generated by the lexicon group tree generation device 100, the speech recognition device 200 recognizes lexicons using actual input speech and the generated lexicon group tree (a lexicon group having a tree structure and a centroid lexicon representing the lexicon group).

In the above embodiment, even though node branching is performed, a factor α for controlling the initial number of states of the centroid lexicon is constant, but the present disclosure is not limited to the embodiment and can use a higher α as node branching progresses (that is, as the depth of a tree increases). In this case, there is an advantage in that precision is further improved in proportion to the proximity to the terminal nodes.

Figure 15:
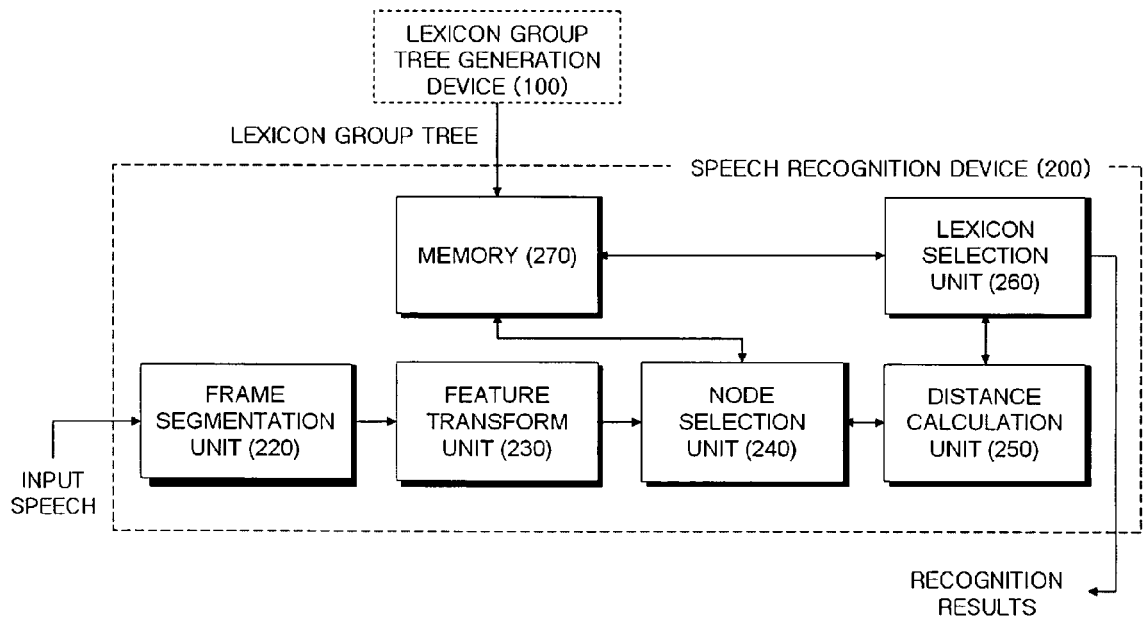
FIG. 15 is a diagram showing the construction of a speech recognition device according to an embodiment of the present invention.

FIG. 15 is a block diagram showing the construction of the speech recognition device 200. A speech recognition procedure is performed by the speech recognition device 200 in such a way that the lexicon group tree creation device 100 repeatedly performs a procedure of comparing a centroid lexicon of each lexicon group with an input speech. It should be noted that the centroid lexicon may designate a virtual centroid lexicon used in the lexicon group tree generation device 100, or designate an actual lexicon having the shortest distance to the virtual centroid lexicon to reduce required memory.

A frame segmentation unit 220 segments an input acoustic signal into frames. Such a frame is obtained by expressing a sound source, which is output for a predetermined time unit (for example, 10 milliseconds), by a predetermined number of signal samples (for example, 256). The frame is a unit of data processing, such as various transforms or compressions. The number of signal samples selected can vary depending on target speech quality.

A feature transform unit 230 transforms the segmented frames into signal frames in a frequency domain, and linearly transforms the signal frames in the frequency domain into frames in a dimensional space in which the features of the input speech signal can be sufficiently exhibited. As a method of transforming the segmented frames into the signal frames in the frequency domain, a discrete Fourier transform, in particular, a Fast Fourier Transform (FFT), can be generally used. Further, as the linear transformation, various dimensional spatial transformation methods, such as a transformation method using a Mel-filter bank that is defined by the European Telecommunication Standards Institute (ETSI) standard, or a Principal Coordinate Analysis (PCA) transformation method, can be used.

A node branching determination unit 240 selects a node matched with the input speech over a range from a root node to terminal nodes, from the generated lexicon group tree. Such a selection procedure includes the steps of comparing the input speech signal, segmented into frames, with the centroid lexicon of a corresponding node, and sequentially selecting nodes having high similarity (or having a short distance between lexicons).

Figure 16:
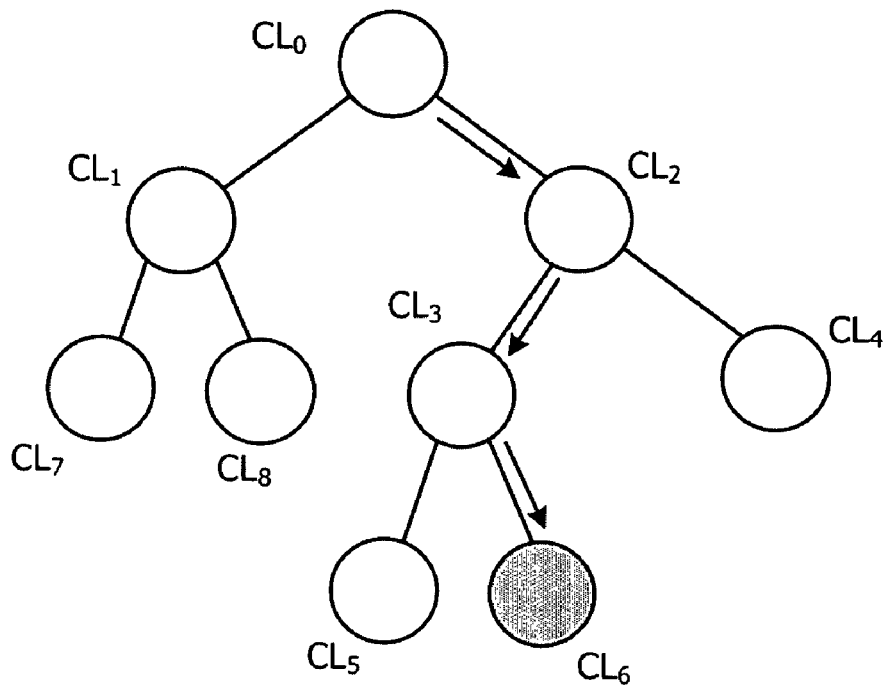
FIG. 16 is a diagram showing an example of a node selection procedure performed by a node branching determination unit.

FIG. 16 is a diagram showing an example of the node selection procedure. First, an input speech signal frame is compared to the centroid lexicons of nodes $CL_1$ and $CL_2$, which branch from the root node $CL_0$, and the node $CL_2$, including a centroid lexicon having higher similarity, is selected. Next, the input speech signal frame is compared to the centroid lexicons of nodes $CL_3$ and $CL_4$, which branch from the node $CL_2$, respectively, and the node $CL_3$, including a centroid lexicon having higher similarity, is selected. Further, the input speech signal frame is compared to the centroid lexicons of nodes $CL_5$ and $CL_6$, branching from the node $CL_3$, respectively, and the node $CL_6$, including a centroid lexicon having higher similarity, is selected.

The node $CL_6$ is a terminal node that does not have a lower node, so that the input speech can be considered to be most similar to the node $CL_6$. Subsequently, a vocabulary most similar to the input speech is found among the lexicons belonging to the node $CL_6$.

The node branching determination unit 240 allows the distance calculation unit 250 to calculate the distance between the input speech and a corresponding centroid lexicon so as to determine similarity.

Figure 17:
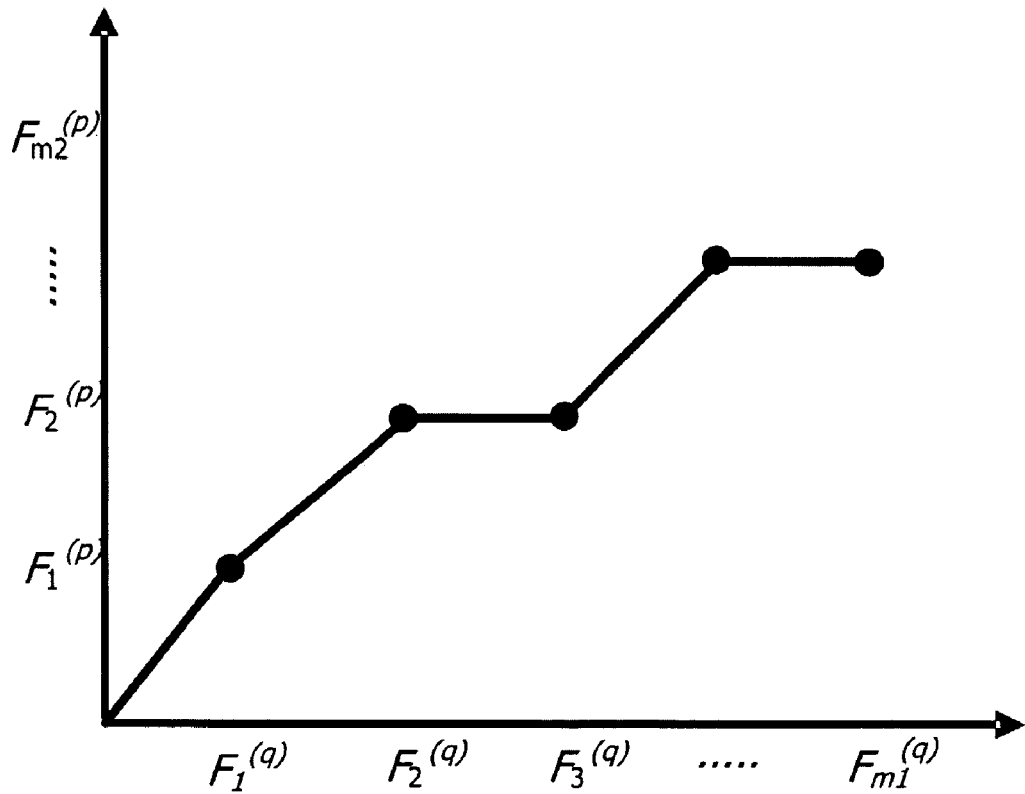
FIG. 17 is a diagram showing an example of the calculation of a cumulative distance for each frame.

The calculation of the distance between lexicons by the distance calculation unit 250 is basically identical to the calculation of the distance between lexicons by the distance calculation unit 140 of the lexicon group tree creation device 100. However, since the speech recognition device 200 cannot recognize the lexicon of the input speech at the time that the speech is input, the comparison between states cannot be performed. Therefore, the speech recognition device 200 performs distance calculation with respect to frames, not states, as shown in FIG. 17. In FIG. 17, $F_{m2}^{(p)}$ means an m2-th frame of a lexicon (p), and $F_{m1}^{(p)}$ means an m1-th frame of the lexicon (p). A single lexicon is composed of 1 to 3 states, but can be composed of several hundreds of frames when a frame time is given as 10 ms. Accordingly, the distance calculation unit 250 calculates more cumulative distances than the distance calculation unit 140.

Memory 270 stores the lexicon group tree generated by the lexicon group tree generation device 100, stores the number of a terminal node selected by the node branching determination unit 240 depending on an input speech frame, and provides a lexicon group corresponding to the number of the terminal node to a lexicon selection unit 260 when the lexicon selection unit 260 selects a lexicon.

The lexicon selection unit 260 loads a lexicon group indicated by a node that is selected by the distance calculation unit 250, and selects a lexicon most similar to the input speech from the lexicon group. The process of selecting the most similar lexicon also includes the steps of the distance calculation unit 250 calculating cumulative distances between the input speech and respective lexicons, and selecting a lexicon having a minimum cumulative distance. Here, even in this case, the calculation of each cumulative distance is performed with respect to frames.

The components of FIG. 3 and FIG. 15 may be software, or hardware such as a Field-Programmable Gate Array (FPGA) or an Application-Specific Integrated Circuit (ASIC). However, the components are not limited to software or hardware, but may be implemented to be stored in an addressable storage medium or to execute one or more processors. The functions provided in the components may be implemented by subdivided components, or implemented as a single component into which a plurality of components is combined to perform a specific function.

Figure 18:
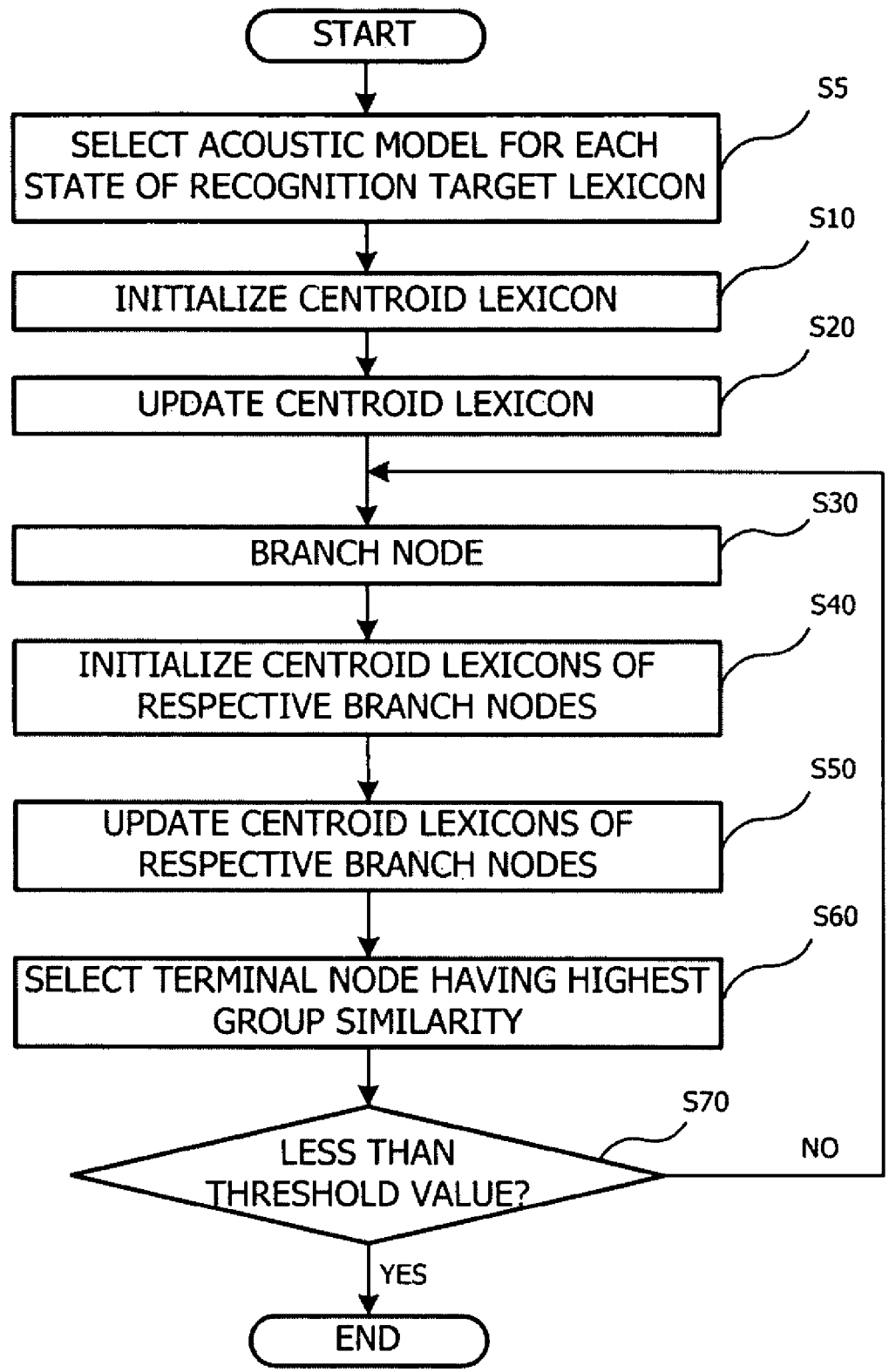
FIG. 18 is a flowchart of a lexicon group tree generation method according to an embodiment of the present invention.

FIG. 18 is a flowchart of a lexicon group tree generation method (performed by the lexicon group tree generation device 100) according to an embodiment of the present disclosure.

First, the acoustic model generation unit 110 selects an acoustic model for each state of a recognition target lexicon at step S5. Further, the centroid lexicon generation unit 125 initializes a centroid lexicon, representing lexicons belonging to a predetermined lexicon group, at step S10, and updates the centroid lexicon at step S20, thus generating a centroid lexicon.

Next, the node branching unit 150 selects two lexicons, having the longest distance therebetween within the lexicon group, using the centroid lexicon from the lexicon group, and branches a node, indicating the lexicon group, based on the two selected lexicons at step S30. Then, the centroid lexicon generation unit 125 initializes centroid lexicons of respective lexicon groups indicated by branch nodes at step S40, and updates the centroid lexicons at step S50, thus generating the centroid lexicons.

Next, the node branching determination unit 160 selects a node having the lowest group similarity among current terminal nodes including the branch nodes at step S60. In this case, two or more nodes, which have group similarity lower than a predetermined threshold value, can be selected from among the current terminal nodes.

Further, it is determined whether group similarity is equal to or lower than a threshold value at step S70. If the group similarity is equal to or lower than the threshold value (in the case of "no" at step S70), the process is terminated, otherwise the process proceeds to step S30. As an example of a criterion using the threshold value, a criterion by which a variance indicating group similarity becomes lower than a predetermined threshold value, or a criterion by which the number of lexicons belonging to a node decreases to a predetermined number or less, can be used.

The above-described initialization step S10 or S40 may include the steps of multiplying a number smaller than 1 by the average number of states of the lexicon group and determining the initial number of states expressed by a predetermined integer, uniformly segmenting each lexicon existing in the lexicon group into states depending on the defined initial number of states, allocating the uniformly segmented states to the states of a corresponding centroid lexicon, and obtaining virtual average models for respective states of the centroid lexicon.

Further, the update step S20 or S50 may include the steps of performing distance matching with each lexicon within the corresponding lexicon group, based on the initialized centroid lexicon, allocating states matched through the matching step to respective states of the centroid lexicon, and averaging models allocated to the states of the centroid lexicon to obtain an average vector, thus updating the centroid lexicon.

The initial number of states may be set to increase as the depth of a tree increases.

Further, the node branching step S30 may include the steps of selecting a first lexicon having the longest distance to the centroid lexicon from the lexicon group, selecting a second lexicon having the longest distance to the first lexicon from the lexicon group, and bisecting the remaining lexicons belonging to the corresponding lexicon group based on the two selected lexicons. In this case, at the time of bisecting the remaining lexicons, each of the lexicons of the lexicon group is allocated to the closer one of the two lexicons. At this time, in order to efficiently use memory, if the distance between a corresponding lexicon and the centroid lexicon is within a predetermined threshold value, the lexicon can be allocated to both nodes on which the two lexicons are based.

Further, as shown in FIG. 9, the distance between lexicons may be determined by generating the states of the two lexicons in a two-dimensional coordinate system and calculating cumulative distances at respective coordinate points.

Figure 19:
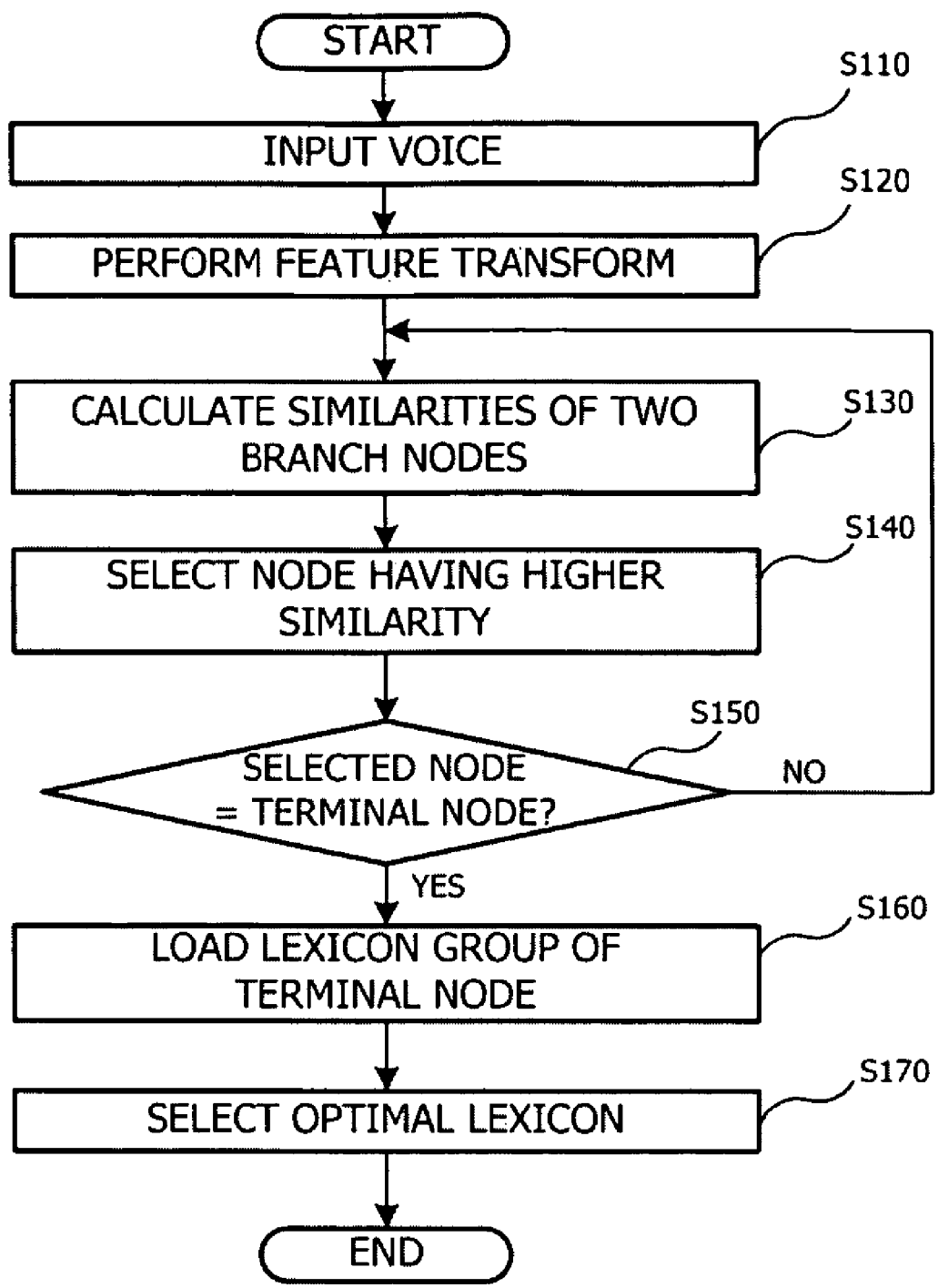
FIG. 19 is a flowchart of a speech recognition method according to an embodiment of the present invention.

FIG. 19 is a flowchart of a speech recognition method (performed by the speech recognition device 200) according to an embodiment of the present disclosure.

First, the frame segmentation unit 220 segments an input acoustic signal into frames at step S110, and the feature transform unit 230 performs a feature transform on the segmented acoustic signal at step 120.

The node selection unit 240 determines similarities between centroid lexicons, representing the two branch nodes, and the feature-transformed acoustic signal at step S130, and selects the node having higher similarity at step S140. Steps S130 and S140 are repeatedly performed until the selected node is a terminal node (in the case of "yes" at step S150).

When the selected node is a terminal node, the lexicon selection unit 260 loads the lexicon group of the terminal node at step S160, and selects a lexicon having higher similarity to the feature-transformed acoustic signal from the loaded lexicon group at step S170.

Step S120 may include the steps of transforming the segmented frames into signal frames in a frequency domain and linearly transforming the signal frames in the frequency domain into frames in a dimensional space in which the features of the input speech can be sufficiently exhibited.

Further, the similarity is determined according to the cumulative distance calculated between the input speech and the centroid lexicon or between the input speech and a lexicon belonging to the loaded lexicon group. The calculation of the cumulative distance may be performed in frames.

Further, the centroid lexicon may be a virtual centroid lexicon provided by the lexicon group generation device 100, but the centroid lexicon of the present disclosure is not limited to the virtual centroid lexicon, and an actual lexicon having a shortest distance to the virtual centroid lexicon can be used as the centroid lexicon.

Hereinafter, experimental results using the speech recognition method of the present disclosure are described. Recognition target vocabularies were ten thousand Positions of Interest (POI) implemented in Korean language, and the maximum number of lexicons to be searched at each selected terminal node limited to 500. Acoustic samples constituting an acoustic model were taken from 50 males and 50 females. Classification results show that lexicons are classified according to the representative category of business in the characteristics of the POI (for example: a bank, a station, a district office, etc.)

FIG. 20 is a diagram showing an example of experimental results using the speech recognition method according to the present disclosure. In FIG. 20, NUM_ELEMENTS 31, denoting the number of lexicons belonging to a lexicon group selected for an input speech, is 69, and INTRA_DISTANCE 32, denoting group similarity of the lexicon group, is 0.528093. Further, NUM_WEIGHT_VECTOR 33, denoting the number of states constituting a centroid lexicon, is 13, MAX_STATE_LEX 34, denoting a vocabulary(lexicon) farthest away from the centroid lexicon, is "Car mania", and MIN_STATE_LEX 35, denoting a a vocabulary(lexicon) modeled using a minimum number of states in the lexicon group, is "Damo wall".

Further, in a square 36 in the center portion of FIG. 20, feature space vectors of the centroid lexicon, weighted by Equation [3], are arranged, and in a lower portion 37 of FIG. 20, lexicons that belong to a classified lexicon group are arranged.

The following Tables 3 to 5 are obtained by arranging experimental results based on a conventional single pass method, a method disclosed in '401 patent, and the method of the present disclosure in the form of tables.

TABLE 3

|  | Conventional single pass method | '401 patent | Present disclosure |
|---|---|---|---|
| Speech recognition rate | 95.8 | 95.75 | 97.03 |

TABLE 4

|  | Acoustic model | Search network | Token | Others | Total |
|---|---|---|---|---|---|
| Conventional single pass method | 2.16 | 2.98 | 3.45 | 0.52 | 9.11 |
| '401 patent | 2.16 | 2.98 | 1.72 | 0.52 | 7.38 |
| Present disclosure | 2.16 | 0.29 | 0.17 | 0.75 | 3.37 |

TABLE 5

|  | Acoustic model | Search network | Token | Others | Total |
|---|---|---|---|---|---|
| Conventional single pass method | 2.16 | 30.00 | 27.00 | 2.00 | 61.66 |
| '401 patent | 2.16 | 30.00 | 13.50 | 2.00 | 47.66 |
| Present disclosure | 2.16 | 0.29 | 0.17 | 3.00 | 5.62 |

Of the above Tables, Table 3 shows a speech recognition rate for each case, and shows that the recognition rate of the method of the present disclosure increased slightly compared to the conventional single pass method and the '401 patent.

Meanwhile, Table 4 shows the result of comparison of the amount of memory used. It can be seen that, in the single pass method, the total amount of memory used was 9.11 Mbytes, and in the '401 patent, the total amount of memory used was 7.38 Mbytes, while, in the present disclosure, the total amount of memory used was only 3.37 Mbytes. In particular, it can be seen that the amount of memory used for search networks and tokens rapidly decreased since the present disclosure loads only the most similar lexicon group on the memory, without loading all search networks on the memory in order to perform recognition.

Tables 3 and 4 were comparison results based on ten thousand vocabularies, but the effect of the present disclosure will be more noticeable when more vocabularies are required to be recognized. Table 5 shows experimental results based on the three methods when twenty thousand vocabularies are required to be recognized. It can be seen that, in the method of the present disclosure, the amount of memory used for search networks or tokens did not changed even though the number of vocabularies to be recognized increased, while in the conventional single pass method or in the method of the '401 patent, the amount of memory used for search networks or tokens rapidly increased.

Although the exemplary embodiments of the present invention have been disclosed for illustrative purposes, those skilled in the art will appreciate that the present invention can be implemented in various forms without departing from the technical spirit or essential features of the invention. Therefore, it should be understood that the above embodiments are only exemplary of all aspects and are not restrictive.

According to the present disclosure, there is an advantage in that the utilization of system resources of a speech recognizer can be reduced, so that devices having restrictive system resources, such as PDAs or cellular phones, can support large-scale speech recognition.

According to the present disclosure, there is an advantage in that the depth of node branching can be suitably controlled, so that the function of adjusting the accuracy of speech recognition suitable for a device, in which a speech recognizer is mounted, that is, scalability, can be supported.

What is claimed is:

1. A method of generating a lexicon group tree, comprising the steps of:
   (a) generating, using at least one processor, a centroid lexicon representing lexicons belonging to a predetermined lexicon group;
   (b) selecting two lexicons, having a longest distance therebetween in the lexicon group, using the centroid lexicon from the lexicon group, and branching a node indicating the lexicon group, based on the two selected lexicons; and
   (c) selecting a node having low group similarity from among current terminal nodes, including branch nodes, and repeatedly performing steps (a) and (b) on a lexicon group indicated by the selected node,
   wherein the steps (a) and (b) are repeatedly performed until a variance, indicating group similarity, becomes lower than a predetermined threshold value and/or until the number of lexicons, belonging to a node, decreases to a predetermined number or less, and
   wherein the step (b) comprises the steps of:
      (b1) selecting a first lexicon having a longest distance to the centroid lexicon from the lexicon group;
      (b2) selecting a second lexicon having a longest distance to the first lexicon from the lexicon group; and
      (b3) bisecting remaining lexicons belonging to the lexicon group, based on the two selected lexicons.

2. The lexicon group tree generation method according to claim 1, wherein the step (a) comprises the steps of:
   (a1) initializing a virtual centroid lexicon of the lexicon group; and
   (a2) updating the centroid lexicon using the initialized centroid lexicon.

3. The lexicon group tree generation method according to claim 2, wherein the step (a1) comprises the steps of:
   (a11) multiplying a number smaller than 1 by the average number of states of the lexicon group, thus determining the initial number of states expressed by a predetermined integer;
   (a12) uniformly segmenting each lexicon, existing in the lexicon group, into states depending on the initial number of states;
   (a13) allocating the uniformly segmented states to states of the centroid lexicon; and
   (a14) obtaining virtual average models for respective states of the centroid lexicon.

4. The lexicon group tree generation method according to claim 3, wherein the initial number of states increases as depth of a tree increases.

5. The lexicon group tree generation method according to claim 2, wherein the step (a2) comprises the steps of:
   (a21) performing distance matching with each lexicon in the corresponding lexicon group, based on the initialized centroid lexicon;
   (a22) allocating states matched through the matching step to respective states of the centroid lexicon; and
   (a23) averaging models allocated to the states of the centroid lexicon and obtaining an average vector, thus updating the centroid lexicon.

6. The lexicon group tree generation method according to claim 1, wherein the step (b3) comprises the step of allocating each of the lexicons of the lexicon group to a node on which a closer one of the two selected lexicons is based, and allocating a corresponding lexicon to two nodes on which the two lexicons are based when a distance between the centroid lexicon and the corresponding lexicon is within a predetermined threshold value.

7. The lexicon group tree generation method according to claim 1, wherein the step (c) comprises the step of selecting all of two or more nodes, having group similarity lower than a predetermined threshold value, from among the current terminal nodes, thus repeatedly performing steps (a) and (b) on the selected nodes.

8. The lexicon group tree generation method according to claim 1, wherein the distance between lexicons is determined by generating states of the two lexicons in a two-dimensional coordinate system and calculating cumulative distances at respective coordinate points.

9. A device for generating a lexicon group tree, comprising:
at least one processing unit comprising:
   a centroid lexicon generation unit, using the at least one processing unit to generate a centroid lexicon representing lexicons belonging to a predetermined lexicon group;
   a node branching determination unit to select a node having low group similarity from among current terminal nodes; and
   a node branching unit to select two lexicons, having a longest distance therebetween in the lexicon group, using the centroid lexicon from the lexicon group, and branching a node indicating the lexicon group, based on the two selected lexicons,
   wherein the node branching is repeatedly performed until a variance, indicating group similarity, becomes lower than a predetermined threshold value and/or until the number of lexicons, belonging to a node, decreases to a predetermined number or less, and wherein the node branching unit selects a first lexicon having a longest distance to the centroid lexicon from the lexicon group, selects a second lexicon having a longest distance to the first lexicon from the lexicon group, and bisects remaining lexicons belonging to the lexicon group, based on the two selected lexicons.

10. The lexicon group tree generation device according to claim 9, wherein the centroid lexicon generation unit initializes a virtual centroid lexicon of the lexicon group, and updates the centroid lexicon using the initialized centroid lexicon.

11. The lexicon group tee generation device according to claim 10, wherein the centroid lexicon generation unit multiplies a number smaller than 1 by the average number of states of the lexicon group to determine the initial number of states expressed by a predetermined integer, uniformly segments each lexicon, existing in the lexicon group, into states depending on the initial number of states, allocates the uniformly segmented states to states of the centroid lexicon, and obtains virtual average models for respective states of the centroid lexicon.

12. The lexicon group tree generation device according to claim 11, wherein the initial number of states increases as depth of a tree increases.

13. The lexicon group tree generation device according to claim 10, wherein the centroid lexicon generation unit performs distance matching with each lexicon in the corresponding lexicon group, based on the initialized centroid lexicon, allocates states matched through the matching step to respective states of the centroid lexicon, and updates the centroid lexicon by averaging models allocated to the states of the centroid lexicon and obtaining an average vector.

14. The lexicon group tree generation device according to claim 9, wherein the node branching unit allocates each of the lexicons of the lexicon group to a node on which a closer one of the two selected lexicons is based, and allocates a corresponding lexicon to both the two nodes on which the two lexicons are based when a distance between the centroid lexicon and the corresponding lexicon is within a predetermined threshold value.

15. The lexicon group tree generation device according to claim 9, wherein the node branching determination unit selects all nodes, having group similarity lower than a predetermined threshold value, from among the current terminal nodes.

16. The lexicon group tree generation device according to claim 9, wherein the distance between lexicons is determined by generating states of the two lexicons in a two-dimensional coordinate system and calculating cumulative distances at respective coordinate points.

* * * * *

UNITED STATES PATENT AND TRADEMARK OFFICE
CERTIFICATE OF CORRECTION

| | | |
|---|---|---|
| PATENT NO. | : 7,953,594 B2 | Page 1 of 1 |
| APPLICATION NO. | : 11/342701 | |
| DATED | : May 31, 2011 | |
| INVENTOR(S) | : Sang-bae Jeong et al. | |

It is certified that error appears in the above-identified patent and that said Letters Patent is hereby corrected as shown below:

Title Page Item (75) (Inventors), Line 3, Delete "Yonginn-si" and insert -- Yongin-si --, therefor.

Signed and Sealed this
Fourteenth Day of February, 2012

David J. Kappos
*Director of the United States Patent and Trademark Office*